(12) United States Patent
Roger

(10) Patent No.: US 9,254,783 B2
(45) Date of Patent: Feb. 9, 2016

(54) DEVICE FOR DRIVING A PLURALITY OF LIGHT BLOCKS OF A MOTOR VEHICLE

(71) Applicant: VALEO VISION, Bobigny Cedex (FR)

(72) Inventor: Christophe Roger, Saint-Lambert-la-Potherie (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/526,995

(22) Filed: Oct. 29, 2014

(65) Prior Publication Data

US 2015/0115795 A1    Apr. 30, 2015

(30) Foreign Application Priority Data

Oct. 30, 2013   (FR) ..................... 13 60592

(51) Int. Cl.
  *B60Q 1/34*    (2006.01)
  *H05B 37/02*   (2006.01)
  *B60Q 1/00*    (2006.01)
  *B60Q 1/04*    (2006.01)
  *B60Q 1/28*    (2006.01)
  *H05B 33/08*   (2006.01)

(52) U.S. Cl.
  CPC ............ *B60Q 1/0076* (2013.01); *B60Q 1/0088* (2013.01); *B60Q 1/04* (2013.01); *B60Q 1/28* (2013.01); *B60Q 1/34* (2013.01); *H05B 33/0806* (2013.01); *H05B 33/0845* (2013.01)

(58) Field of Classification Search
  CPC ...... B60Q 1/0076; B60Q 1/0088; B60Q 1/04; B60Q 1/28; B60Q 1/34; H05B 37/02; H05B 33/08; H05B 33/0806; H05B 33/0845
  USPC .......... 315/77, 78, 82, 209 R, 291, 307, 308, 315/312; 307/10.8
  See application file for complete search history.

(56) References Cited

U.S. PATENT DOCUMENTS

| | | | |
|---|---|---|---|
| 7,081,708 B2 | 7/2006 | Ito et al. | |
| 8,624,499 B2 | 1/2014 | Tanaka | |
| 2004/0075393 A1 | 4/2004 | Ito et al. | |
| 2012/0086336 A1 | 4/2012 | Tanaka | |
| 2013/0200792 A1* | 8/2013 | Brooks | B60Q 1/34 315/77 |

* cited by examiner

*Primary Examiner* — Jimmy Vu
(74) *Attorney, Agent, or Firm* — Jacox, Meckstroth & Jenkins

(57) ABSTRACT

A driver device (P) for a plurality of light blocks (LED_DRL/PL, LED_TI) of a motor vehicle comprising at least two inputs (P1, P2), each of the inputs being suitable for receiving, respectively, a first and a second execution control signals (SCF_DRL, SCF_TI/PL), the driver device being suitable for selecting at least one of the light blocks as a function of at least one of the execution control signals and delivering an electrical power supply to said selected light block, the driver device comprises at least one controller receiving said execution control signals, the controller being suitable for delivering, as a function of the logic state of execution control signals, a switching control signal (SCC) for switching the electrical power supply to the selected light block or blocks and a control signal for controlling the level of power (SCA) of the electrical power supply of the selected light block or blocks.

18 Claims, 2 Drawing Sheets

| SCF_DRL | SCF_TI/PL | SCC_DRL/PL | SCC_TI |
|---------|-----------|------------|--------|
| OFF | OFF | OFF | OFF |
| OFF | ON | OFF | ON (TI) |
| ON | OFF | ON(DRL) | OFF |
| ON | ON | ON(PL) | OFF |

# DEVICE FOR DRIVING A PLURALITY OF LIGHT BLOCKS OF A MOTOR VEHICLE

CROSS-REFERENCE TO RELATED APPLICATIONS

This application claims priority to French Application No. 1360592 filed Oct. 30, 2013, which application is incorporated herein by reference and made a part hereof.

BACKGROUND OF THE INVENTION

1. Field of the Invention

The invention relates to a driver device for a plurality of light blocks of a motor vehicle and a light device for a motor vehicle incorporating such a driver device.

2. Description of the Related Art

In the current driver devices for light blocks of a motor vehicle, the structure of such circuits usually comprises a controller provided with a power stage for each of the light blocks implementing one function or at most a group of two light functions.

Figure 1:
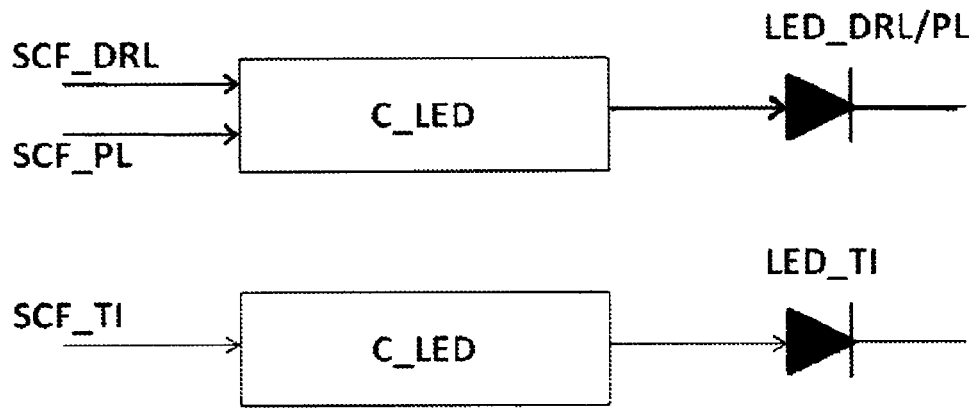

The architecture of such a structure is represented in FIG. 1, relative to the prior art, for the control signals for the daytime running light, or DRL, light function, grouped together with the position light, PL, light function (PL standing for Parking Light), these two functions being driven by a common driver device controlling a common light block, denoted LED_DRL/PL, and, for the control signal of the turn indicator TI light function (TI standing for Turn Indicator).

Such an architecture in fact requires two driver devices, each provided with a power stage, and three distinct inputs, the grouping of the control of the daytime lighting DRL and position light PL functions however requiring separate inputs for the abovementioned control signals.

However, a recent change in the regulations concerning the implementation of motor vehicle lighting and/or signaling devices allows the grouping together of the control signals for the light functions of a vehicle, when this grouping does not compromise either the reliability or the safety of the assembly.

SUMMARY OF THE INVENTION

The object of the present invention is the implementation of a driver device and of a light device for motor vehicles, in which a grouping of the control signals of the light functions makes it possible to reduce the number of inputs of the abovementioned driver device.

Another object of the present invention is, furthermore, the implementation of a driver device and of a light device for motor vehicles by virtue of the architecture of which a single power unit is implemented for all the light functions implemented.

Another object of the present invention is also the implementation of a driver device and a light device for motor vehicles that makes it possible to control a single light block allowing for the execution of a plurality of light functions.

Another object of the present invention is finally the implementation of a driver device and a light device for motor vehicles that makes it possible to significantly simplify the complexity and the bulk of the wiring of the light functions of the motor vehicles and reduce the equipment costs thereof.

The object of the present invention is thus a driver device for a plurality of light blocks of a motor vehicle, the driver device comprising at least two inputs, each of the inputs being suitable for receiving, respectively, a first and a second execution control signals, the driver device being suitable for selecting at least one of the light blocks as a function of at least one of the execution control signals and delivering an electrical power supply to the selected light block, the driver device being characterized in that it comprises at least one controller receiving the execution control signals, the controller being suitable for delivering, as a function of the logic state of the execution control signals, a switching control signal for switching the electrical power supply to the selected light block or blocks and a control signal for controlling the level of power of the electrical power supply of the selected light block or blocks.

In an advantageous embodiment of the invention, each execution control signal received by the driver device also constitutes an electrical power supply, the driver device converting these execution signals into the electrical power supply that has to be switched by the controller to the selected light block or blocks.

Advantageously, the driver device is suitable for selecting a light function to be executed as a function of a combination of the logic states of the execution control signals received on the inputs of the device and for selecting at least one of the light blocks for the execution of the selected light function.

Light function should be understood to mean a part or even all of a predetermined regulatory photometric function.

In one embodiment of the invention, the driver device is suitable for selecting a light function out of a predetermined number of selectable light functions, the number of inputs for execution control signals for the device is less than the predetermined number of selectable light functions.

If appropriate, each light block driven by the driver device is suitable for performing a number of light functions strictly less than the predetermined number of selectable light functions.

Preferably, the driver device is suitable for selecting at least two distinct light functions for one and the same predetermined execution control signal received on one of the execution control signal inputs of the device.

If so desired, the device can be suitable for selecting a light function to be executed as a function of an activation table receiving as input the logic state of each of the execution control signals and delivering the light function to be selected.

If appropriate, the activation table is implemented by a look-up table in the controller or by a microprogram driven by the controller. As a variant, the activation table can be produced in the form of a logic circuit.

For example, the first and second execution control signals can each occupy an 'ON' state or an 'OFF' state.

Advantageously, the driver device selects a first light function when the first and second execution control signals each occupy an 'ON' state.

The driver device can also select a second light function when the first execution control signal occupies an 'ON' state and when the second execution control signal occupies an 'OFF' state.

The driver device can even select a third light function when the first execution control signal occupies an 'OFF' state and when the second execution control signal occupies an 'ON' state.

Advantageously, the controller is suitable for delivering the switching control signal for switching the electrical power supply to the selected light block or blocks for the execution of the selected light function.

If appropriate, the controller is suitable for delivering the switching control signal in the form of a plurality of switching control subsignals, the plurality of subsignals comprising as many subsignals as there are light blocks that can be driven by the driver device, each subsignal controlling the switching of the electrical power supply of a single light block and the switching of the electrical power supply of a light block that is only controlled by a single subsignal. In this case, when the driver device selects a light function, the controller delivers a plurality of control subsignals. At least one subsignal of this plurality controls the switching of the electrical power supply to the light block suitable for executing the selected light function whereas the other subsignal or subsignals prevent the switching of the electrical power supply to the other light block or blocks.

Also advantageously, the controller is suitable for delivering the control signal for controlling the level of power for the execution of the selected light function.

For example, the control signal for controlling the level of power can control a pulse width modulation of the electrical power supply adapted for the execution of the selected light function.

According to another example, the control signal for controlling the level of power can also control the level of amplitude of the electrical power supply adapted for the execution of the selected light function.

In one embodiment of the invention, the controller comprises a first input for the reception of the first execution control signal, a second input for the reception of the second execution control signal.

If necessary, the controller can comprise a first output for the delivery of the control signal for controlling the level of power and at least one second output for the delivery of the switching control signal.

Advantageously, the driver device comprises a power module comprising an output, the power module being suitable for delivering the electrical power supply on its output as a function of the control signal for controlling the level of power. The electrical power supply can therefore be pulse width modulated according to a duty cycle determined according to the control signal for controlling the level of power and/or exhibit a level of amplitude determined according to the control signal for controlling the level of power so that its power is adapted to the execution of the selected light function and in particular to the light power needed for the execution of this light function selected by the selected light block or blocks so as to fulfill the regulatory requirements applicable to this light function.

If necessary, the power module comprises a first input connected to the first output of the controller to receive the control signal for controlling the level of power delivered by the controller.

Preferably, the driver device comprises a switch comprising a first input connected to the output of the power module to receive the electrical power supply, the switch being arranged to switch the electrical power supply to the selected light block or blocks.

If necessary, the switch comprises at least one second input connected to the second output of the controller to receive the switching control signal delivered by the controller.

Another object of the invention is a light device, notably for lighting and/or signaling, for a motor vehicle comprising a plurality of light modules, characterized in that it comprises a driver device for the plurality of light modules according to the invention.

If necessary, each light block is suitable for performing a number of light functions strictly less than the predetermined number of light functions that can be performed by the light device.

Advantageously, the light device comprises a first light block suitable for selectively executing a first and a second light functions and a second light block suitable for executing a third light function.

Preferably, the first light function is a position light, the second light function is a daytime running light and the third light function is a turn indicator.

Advantageously, each light block of the plurality of light blocks comprises at least one LED for executing the light function or functions that can be executed by this block.

The driver device and the light device for a motor vehicle that are the object of the invention are applicable to the equipment of motor vehicles of any type.

BRIEF DESCRIPTION OF THE ACCOMPANYING DRAWINGS

Figure 2:
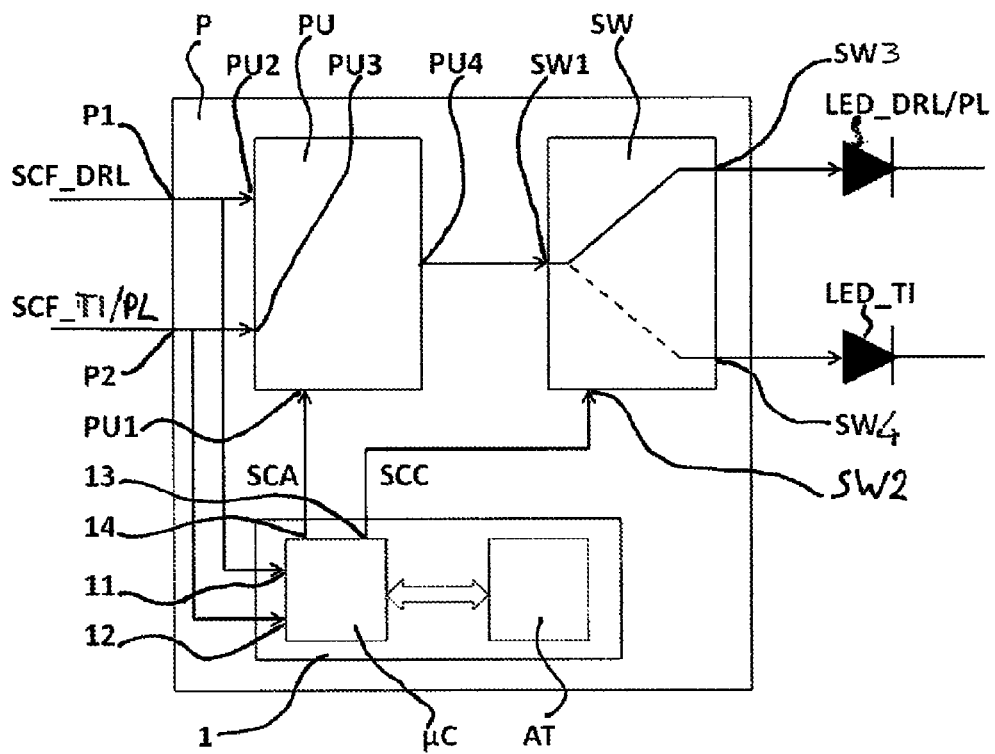
Figures 3, 4:
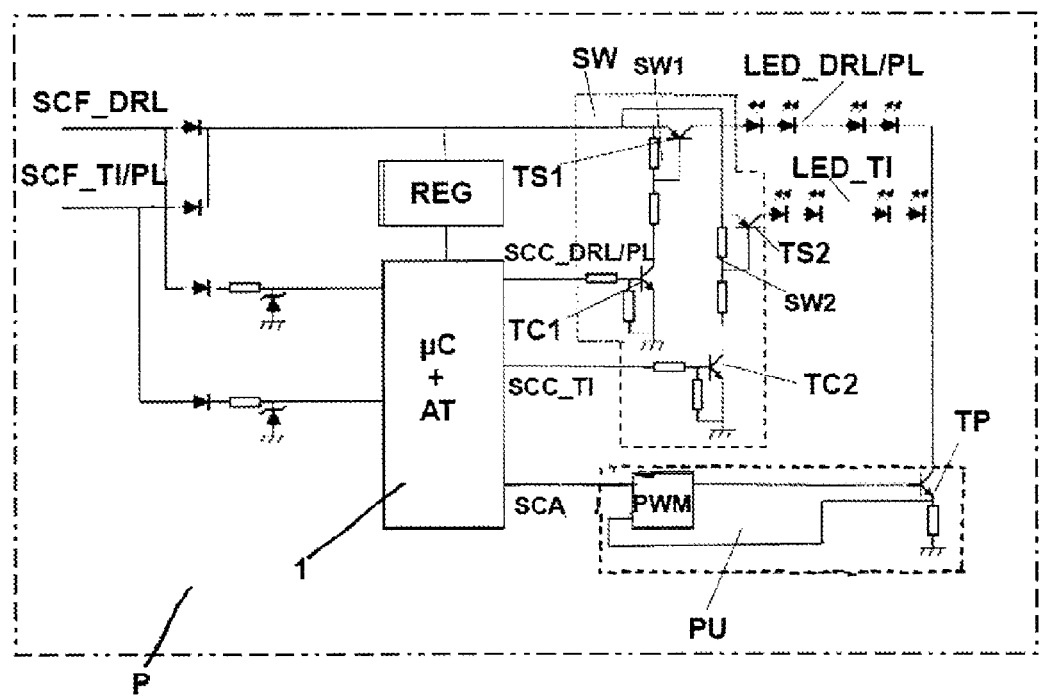

They will be better understood on reading the following description and studying the following drawings, in which:

FIG. 1 concerns the prior art;

FIG. 2 represents, for purely illustrative purposes, the functional block diagram of a driver device for a plurality of light blocks of a motor vehicle according to the invention;

FIG. 3 represents, for purely illustrative purposes, a detailed diagram of implementation of the driver device as represented in FIG. 2; and FIG. 4 represents, by way of illustration, an activation table that makes it possible to implement the driver device of FIG. 2, in the context of the non-limiting example of the switching of the daytime running lights DRL, of the turn indicator TI lights function and of the position lights PL function of a motor vehicle.

DETAILED DESCRIPTION OF THE PREFERRED EMBODIMENTS

A more detailed description of a controller of a driver device for a plurality of light blocks of a motor vehicle according to the invention is now given in conjunction with FIG. 2.

FIG. 2 shows a driver device P for two light blocks LED_DRL/PL and LED_TI of a motor vehicle.

The light block LED_DRL/PL is suitable for selectively executing a first function of position light PL type and a second light function of daytime running light DRL type. The light block LED_TI is suitable for executing a third light function of turn indicator TI type.

The driver device P comprises two inputs P1 and P2. Each of the inputs P1 and P2 is suitable for respectively receiving a first and a second electrical power supply SCF_DRL and SCF_TI/PL. These first and second electrical power supplies respectively constitute first and second execution control signals SCF_DRL and SCF_TI/PL that can each occupy an "ON" state or an "OFF" state.

The driver device P comprises at least one controller 1. The controller 1 comprises a first input 11 for the reception of the first execution control signal SCF_DRL and a second input 12 for the reception of the second execution control signal SCF_TI.

The controller 1 is suitable for selecting a light function out of the TI, PL and DRL functions to be executed as a function of a combination of the logic states of the execution control signals SCF_DRL and SCF_TI/PL such that the driver device P can select the light block out of the blocks LED_DRL/PL and LED_TI so as to deliver an electrical power supply to this selected block for the execution of the selected light function. It is moreover noted that the number of execution control signal inputs of the device is less than the number of light functions that can be performed by the light blocks LED_DRL/PL and LED_TI.

To this end, the controller 1 comprises an activation table AT implemented in the form of a look-up activation table AT and a microcontroller µC reading this look-up activation table AT. As a variant, the activation table AT could be implemented in the form of a microprogram directly driven by the microcontroller µC.

The activation table AT receives as input the logic state of each of the execution control signals SCF_DRL and SCF_TI/PL and delivers as output the light function to be executed.

The activation table AT selects:

the first light function PL when the first and second execution control signals SCF_DRL and SCF_TI/PL each occupy an "ON" state;

the second light function DRL when the first execution control signal SCF_DRL occupies an "ON" state and when the second execution control signal SCF_TI/PL occupies an "OFF" state; and the third light function TI when the first execution control signal SCF_DRL occupies an "OFF" state and when the second execution control signal SCF_TI/PL occupies an "ON" state.

In this way, the activation table AT is suitable for selecting two distinct light functions DRL or PL for one and the same logic state of the execution control signal SCF_DRL received on the input P1 of the driver device P.

The microcontroller µC delivers, as a function of the selected light function, a switching control signal for switching the electrical power supply SCC to the selected light block and a control signal for controlling the level of power of the electrical power supply SCA for the selected light block so that said selected light block executes the selected light function.

The controller 1 comprises a first output 14 for the delivery of the control signal for controlling the level of power SCA and a second output 13 for the delivery of the switching control signal SCC.

The driver device P comprises a power module PU comprising first, second and third inputs PU1, PU2 and PU3 and one output PU4. The first input PU1 of the power module PU is connected to the first output 14 of the controller 1 to receive the control signal for controlling the level of power SCA delivered by the controller 1. The second and third inputs PU2 and PU3 respectively receive the first and second execution control signals SCF_DRL and SCF_TI/PL.

The power module PU converts the execution control signals SCF_DRL and SCF_TI/PL into an electrical power supply as a function of the control signal for controlling the level of power SCA and delivers this power supply on its output PU4. For example, the control signal for controlling the level of power SCA can order a pulse width modulation of the electrical power supply and/or the level of amplitude of the electrical power supply such that the power of the electrical power supply is adapted for the execution of the selected light function. Thus, the power module PU delivers, on its output PU4, an electrical power supply that is pulse width modulated according to a duty cycle determined according to the control signal for controlling the level of power SCA and/or exhibiting a level of amplitude determined according to the control signal for controlling the level of power SCA such that its power is adapted to the execution of the selected light function and in particular to the light power needed for the execution of this light function so as to fulfill the regulatory requirements applicable to this light function.

The driver device P moreover comprises a switch SW comprising a first input SW1 connected to the output PU4 of the power module PU to receive the electrical power supply and a second input connected to the second output 13 of the controller 1 to receive the switching control signal SCC delivered by the controller 1.

As a function of the switching control signal SCC delivered by the controller 1, the switch SW switches the electrical power supply to the selected light block for the execution of the selected light function.

The functional diagram of the driver device P according to the invention as represented in FIG. 2 can advantageously be implemented in a nonlimiting embodiment as described in conjunction with FIG. 3, as follows.

As represented in FIG. 3, the driver device P comprises the above-mentioned controller 1, consisting of a microcontroller µC with which the activation table AT is associated. The controller 1 receives the execution control signals SCF_DRL and SCF_TI/PL and comprises a 5 volt voltage regulator REG allowing for its power supply.

The controller 1 delivers the switching control signal SCC in the form of two switching control subsignals SCC_DRL/PL and SCC_TI.

The switch SW comprises a first switching circuit SW1 to the light block LED_DRL/PL and a second switching circuit SW2 to the light block LED_TI. Each of the abovementioned switching circuits consists of a transistor switch TS1, TS2 controlled by a control transistor TC1, TC2, each receiving one of the switching control subsignals SCC_DRL/PL, respectively SCC_TI. The emitter electrode of the transistor TS1, TS2 constituting the corresponding transistor switch is directly connected to the corresponding light block LED_DRL/PL, respectively LED_TI. The collector electrode of the transistor TS1, TS2 constituting the transistor switch is itself connected to the output of the voltage regulator REG.

It will therefore be understood that the subsignal SCC_DRL/PL controls the switching of the electrical power supply only to the light block LED_DRL/PL whereas the subsignal SCC_TI controls the switching of the electrical power supply only to the light block LED_TI. In this case, when the controller 1 selects a light function, one of the subsignals SCC_DRL/PL, SCC_TI controls the switching of the electrical power supply to the light block suitable for executing the selected light function whereas the other subsignal prevents the switching of the electrical power supply to the other light block.

Finally, the power module PU comprises a power transistor switch TP controlled by a pulse width modulation control circuit PWM. The collector of the power transistor TP is directly connected to a common terminal of the corresponding light blocks LED_DRL/PL and LED_TI and a feedback circuit from a resistor connected in the emitter of the abovementioned power transistor TP makes it possible to drive the pulse width modulation control circuit PWM.

The pulse width modulation control circuit PWM receives the control signal for controlling the level of power, SCA.

It will thus be understood that the modulation power transistor TP makes it possible, from the signal controlling the amplitude of the abovementioned power supply signal delivered by the controller 1, to consequently modulate, by pulses, the power supply signal for the lighting/signaling blocks LED_DRL/PL or LED_TI, for the execution of the selected lighting/signaling function by the corresponding lighting/signaling block.

Finally, FIG. 4 shows, in table form, the truth table of the logical combination of the logic states of the execution control signals in the exemplary application of FIG. 3.

The first two columns on the left give the logic value of the execution control signal SCF_DRL, respectively of the execution control signal SCF_TI/PL, and the last two columns on the right, the logic value of the switching control subsignal SCC_DRL/PL, respectively of the switching control subsignal SCC_TI.

Thus, the logic combination rules establishing the values at the output of the look-up table can be stated as follows:

when the execution control signal SCF_DRL is in the OFF logic state and when the execution control signal SCF_TI/PL is in the OFF logic state, the switching control subsignal SCC_DRL/PL is in the OFF logic state and the switching control subsignal SCC_TI is in the OFF state;

when the execution control signal SCF_DRL is in the OFF logic state and when the execution control signal SCF_TI/PL is in the ON logic state, the switching control subsignal SCC_DRL/PL is in the OFF logic state and the switching control subsignal SCC_TI is in the ON state;

when the execution control signal SCF_DRL is in the ON logic state and when the execution control signal SCF_TI/PL is in the OFF logic state, the switching control subsignal SCC_DRL/PL is in the ON logic state and the switching control subsignal SCC_TI is in the OFF state; and when the execution control signal SCF_DRL is in the ON logic state and when the execution control signal SCF_TI/PL is in the ON logic state, the switching control subsignal SCC_DRL/PL is in the ON logic state and the switching control subsignal SCC_TI is in the ON state.

It will thus be understood that, on the one hand, each of the switching control subsignals SCC_DRL/PL and SCC_TI makes it possible to ensure the switching of the electrical power supply to the lighting/signaling blocks LED_DRL/PL, respectively LED_TI, and that, on the other hand, the control signal SCA, delivered jointly and in correspondence with the abovementioned switching signal, makes it possible to route the level of power of the power supply for the execution of the selected light function.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A driver device (P) for a plurality of light blocks (LED_DRL/PL, LED_TI) of a motor vehicle, said driver device comprising at least two inputs (P1, P2), each of said at least two inputs being suitable for receiving, respectively, a first and a second execution control signals (SCF_DRL, SCF_TI/PL), said driver device being suitable for selecting at least one of said plurality of light blocks as a function of at least one of said first or said second execution control signals and delivering an electrical power supply to said selected light block, said driver device comprises at least one controller receiving said execution control signals, said at least one controller being suitable for delivering, as a function of a logic state of said first and second execution control signals, a switching control signal (SCC) for switching said electrical power supply to said selected light block or blocks and a control signal for controlling a level of power (SCA) of said electrical power supply of said selected light block or blocks.

2. The driver device (P) according to claim 1, wherein said driver device is suitable for selecting a light function to be executed as a function of a combination of the logic states of said first and second execution control signals (SCF_DRL, SCF_TI/PL) received on said at least two inputs (P1, P2) of said driver device and for selecting at least one of said plurality of light blocks (LED_DRL/PL, LED_TI) for the execution of said selected light function.

3. The driver device (P) according to the claim 1, wherein said driver device is suitable for selecting a light function out of a predetermined number of selectable light functions, the number of said at least two inputs (P1, P2) for said first and second execution control signals (SCF_DRL, SCF_TI/PL) from said driver device being less than said predetermined number of selectable light functions.

4. The driver device (P) according to claim 2, wherein said driver device is suitable for selecting a light function to be executed as a function of an activation table (AT) receiving as input a logic state of each of said first and second execution control signals (SCF_DRL, SCF_TI/PL) and delivering said light function to be selected.

5. The driver device (P) according to claim 4, wherein said activation table (AT) is implemented by a look-up table (AT) in said at least one controller or by a microprogram driven by said at least one controller.

6. The driver device (P) according to claim 2, wherein said at least one controller is suitable for delivering a switching control signal (SCC) for switching said electrical power supply to said selected light block or blocks for the execution of said selected light function.

7. The driver device (P) according to claim 2, wherein said at least one controller is suitable for delivering a control signal for controlling a level of power (SCA) for the execution of said selected light function.

8. The driver device (P) according to claim 7, wherein said control signal for controlling said level of power (SCA) controls a pulse width modulation of said electrical power supply adapted for the execution of said selected light function.

9. The driver device (P) according to claim 7, wherein said control signal for controlling said level of power (SCA) controls a level of amplitude of said electrical power supply adapted for the execution of said selected light function.

10. The driver device (P) according to claim 1, wherein said at least one controller comprises a first input for a reception of said first execution control signal (SCF_DRL) and a second input for reception of said second execution control signal (SCF_TI/PL).

11. The driver device (P) according to claim 10, wherein said at least one controller comprises a first output for the delivery of said control signal for controlling said level of power (SCA) and at least one second output for the delivery of said switching control signal (SCC).

12. The driver device (P) according to claim 1, wherein said driver device comprises a power module (PU) comprising an output (PU4), said power module being suitable for delivering said electrical power supply on its output as a function of said control signal for controlling said level of power (SCA).

13. The driver device (P) according to claim 12, wherein said power module (PU) comprises a first input (PU1) connected to said first output of said at least one controller to receive said control signal for controlling said level of power (SCA) delivered by said at least one controller.

14. The driver device (P) according to claim 12, wherein said drive device comprises a switch (SW) comprising a first input (SW1) connected to said output (PU4) of said power module (PU) to receive said electrical power supply, said switch being arranged to switch said electrical power supply to said selected light block or blocks.

15. The driver device (P) according to claim 14, wherein said switch (SW) comprises at least one second input (SW2)

connected to said second output of said at least one controller to receive said switching control signal (SCC) delivered by said at least one controller.

16. A light device, notably for lighting and/or signaling, for a motor vehicle comprising a plurality of light modules (LED_DRL/PL, LED_TI), wherein said light device comprises a driver device (P) for a plurality of light modules according to claim 1.

17. The light device according to claim 16, wherein said light device comprises a first light block (LED_DRL/PL) suitable for selectively executing a first and a second light function and a second light block (LED_TI) suitable for executing a third light function.

18. The light device according to claim 17, wherein said first light function is a daytime running light, said second light function is a position light and third light function is a turn indicator.

* * * * *